Dec. 30, 1930.  K. TESSKY  1,786,876

FEEDING DEVICE FOR MACHINE TOOLS

Filed March 21, 1929

Inventor:
Karl Tessky

Patented Dec. 30, 1930

1,786,876

UNITED STATES PATENT OFFICE

KARL TESSKY, OF ESSLINGEN-ON-THE-NECKAR, GERMANY

FEEDING DEVICE FOR MACHINE TOOLS

Application filed March 21, 1929, Serial No. 348,804, and in Germany March 28, 1928.

My invention relates to feeding devices for machine tools and more especially to means for guiding bars to be fed to lathes and the like. It is an object of my invention to provide a tubular guide for bars in which the drawbacks normally arising owing to the bar getting into contact with the tubular guide and causing knocking, wear and noise, are eliminated.

To this end I equip the tubular guide with a tubular lining in the shape of a coiled spring of varying internal diameter, so that this coil is corrugated in axial section. The crests and bases of the corrugations will alternately engage the end of the bar, as it is being fed, and the wall of the guide, and there will be coils intermediate the crests and bases which are neither in contact with the bar nor with the guide.

The bars being fed to a lathe, to be operated upon, rotate rapidly and inevitably strike the walls of the plain tubular guides hitherto used, causing unpleasant noise and considerable wear of the bar and the guide, particularly with bars of angular section. It has therefore been proposed to make the guides of wood instead of metal tubing or to line metal tubing with leather or other soft material, but the wear of such linings is excessive, particularly with bars of angular section, and the intensity of the knocking increases with the wear. Therefore these expedients had to be abandoned in favor of the plain metal tubing, notwithstanding its drawbacks.

It has further been suggested to support the tubular guide on ball bearings, thereby allowing it to partake in the rotation of the bar. In the majority of cases such guide tubes were also lined with shock absorbing material, but it was found that the wear was the same as, and the knocking and noise were only slightly less than in the plain tubes. The rotary guide involves another drawback in screw cutting and other machines in which the direction of rotation of the bar and consequently that of the tube is reversed abruptly, such reversing subjecting the friction faces of the reversing clutch to excessive stress as the revolving mass, which is reversed, is increased considerably by the heavy tube and its bearings, so that during the period which elapses from the moment of reversing until the tube has assumed uniform velocity, increased load and heavier stress are exerted on the friction clutch and power is wasted.

These drawbacks are eliminated according to the present invention by a very simple device which eliminates knocking of the bar in the tubular guide and its undesirable consequences, such as damage to the bar, wear of the guide, noise, and waste of power. All these drawbacks are reduced to such a minimum as to be no longer troublesome, and the spring liner according to this invention is extremely durable.

In the drawings affixed to this specification and forming part thereof a tubular guide embodying my invention is illustrated diagrammatically by way of example.

In the drawings

Figure 1:
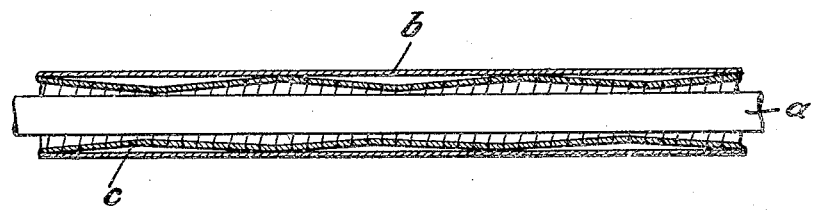
Fig. 1 is a longitudinal section.

Referring to the drawings, $a$ is the bar to be fed, $b$ is the tubular guide, and $c$ is a coiled spring or liner which is inserted in the tubular guide $b$ so as to be retained therein by friction. The spring is corrugated in axial section, its outer diameters varying from a maximum to a minimum at a given pitch. At the points of maximum diameter (the crests) the spring hugs the tubular guide on the inside while at the points of minimum diameter (the bases) the spring forms a row of supports for the bar $a$. The intermediate coils, which neither hug the bar nor the tube, act as balancing and damping springs.

I thus provide a strong resilient liner intermediate the bar and its tubular guide which constitutes a very favorable means for absorbing shocks. Large vibrations of the bar and hard knocking of the bar against the tube are absolutely eliminated.

The spring may be made of hard-drawn spring wire and, as illustrated, the wire may be of rectangular section, but may also have any other cross-section.

Springs of this kind are readily made at low cost and are readily exchangeable. The wear of the spring will be a maximum at the end which faces the machine tool. When the spring has become worn at this end, it is removed from the tube $b$ and reinserted in reversed position. In this manner the life of the spring is practically doubled.

Figure 2:
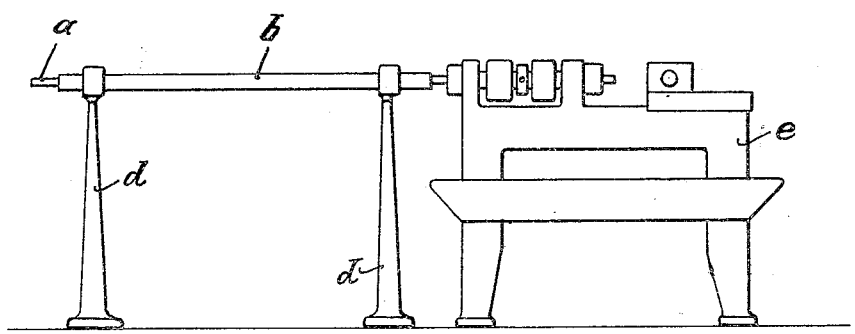
Fig. 2 is an elevation, on a smaller scale, of a machine tool and guide.

Referring now to Fig. 2, the tubular guide $b$ is secured in suitable uprights $d$ from which it can be readily removed. The uprights may also permit rocking of the tube $b$ about one of its ends so that the bar is readily inserted from one end, preferably the one which faces the machine tool. $e$ is a machine tool. The tubular guide according to this invention may be applied to single as well as to multiple-spindle machines.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. Tubular guide for feeding bars to machine tools comprising a guide tube and a lining in this tube having the shape of a coiled spring the diameter of which varies in the axial direction of the coil, some coils being in contact with the inner wall of the tube, others in contact with the bar to be fed, and the rest of the coils intermediate said first and second mentioned coils being neither in contact with the bar nor with the tube.

2. Tubular guide for feeding bars to machine tools comprising a guide tube and a lining in this tube having the shape of a closely wound coiled spring the diameter of which varies in the axial direction of the coil, some coils being in contact with the inner wall of the tube, others in contact with the bar to be fed, and the rest of the coils intermediate said first and second mentioned coils being neither in contact with the bar nor with the tube.

In testimony whereof I affix my signature.

KARL TESSKY.